Jan. 26, 1971 H. L. HARTNAGEL 3,559,069

ELECTRONIC PULSE DURATION MODULATION DEVICES USING TRAVELLING FIELD DOMAIN PHENOMENA

Filed Dec. 6, 1968 4 Sheets-Sheet 1

United States Patent Office 3,559,069

Patented Jan. 26, 1971

3,559,069

ELECTRONIC PULSE DURATION MODULATION DEVICES USING TRAVELLING FIELD DOMAIN PHENOMENA

Hans Ludwig Hartnagel, Sheffield, England, assignor to National Research Development Corporation, London, England, a British corporation Filed Dec. 6, 1968, Ser. No. 781,924
Claims priority, application Great Britain, Dec. 7, 1967, 55,810/67; July 31, 1968, 36,545/68
Int. Cl. H03k 7/08
U.S. Cl. 325—105 18 Claims

ABSTRACT OF THE DISCLOSURE

In a pulse duration modulation device travelling domains are nucleated by the Gunn effect or the like and the path lengths of the domains are varied to vary the duration of signal pulses derived from the domains. In one form the domains are nucleated in response to periodic trigger pulses and the duration modulated signal pulses are utilised in a pulse phase modulator driving a phased aerial array.

The present invention relates to pulse modulation devices operating by use of the Gunn effect and other travelling field domain phenomena.

The Gunn effect is a phenomenon arising in certain semi-conductor materials such as GaAs, CdTe, InP and some alloys of GaAs and GaP in which the application to a body of the material of a voltage sufficient to produce an electric field to or exceeding a certain threshold value produces current instabilities in the body. These current instabilities can be made to produce oscillations in the body from which a microwave output signal can be derived. Such operation has been developed to produce the so-called Gunn diode which can be used as a source of microwave oscillations.

A theory has been developed to explain the mechanism of the Gunn effect, and a brief description of this is given in the specification accompanying the copending patent application Ser. No. 738,890.

Another high-frequency travelling domain phenomenon for example is the avalanche process utilised in the Reid diode in which a localised bunch of charge-carriers is produced in one region of a suitably doped crystal by a high-field avalanching effect and this bunch of charge-carriers travels across a second region in a similar way to a Gunn effect domain.

Travelling domains can also be produced by electro-acoustic effects in semi-conductor materials or by field-dependent trapping processes.

According to the present invention there is provided a pulse duration modulation device comprising a body of material capable of exhibiting a travelling field domain phenomenon when a field is produced in the body above a first threshold value to nucleate a domain and is maintained above a second threshold value to sustain the domain, a plurality of contact means carried on said body, means for applying between the contact means a potential difference to nucleate a field domain in said body, said contact means and said body having a configuration such that said potential produces a non-uniform field in said body, means for deriving signal pulses from field domains in said body, and means for varying the distance travelled by said field domains in said body so as to vary the duration of said signal pulses.

The travelling domains may consist of Gunn effect domains so that there may also be provided in accordance with the invention a pulse duration modulation device comprising a body of semi-conductor material capable of exhibiting the Gunn effect travelling field domain phenomenon, a plurality of contact means comprising electrodes carried on said body, means for applying between said electrodes an electrical potential difference to nucleate a Gunn effect domain in said body, said electrodes and said body having a configuration such that said potential difference produces a non-uniform electric field in said body, means for deriving signal pulses from domains in said body and means for varying the distance travelled by said domains in said body to vary the duration of said signal pulses.

Gunn effect domains are nucleated in a body of material capable of showing the effect when there is applied across the device a potential sufficient to produce within the device an electric field of a certain threshold value $E_t$. When such a potential is applied to the device there is formed a localised region or domain of high electric field which, provided the electric field within the body does not fall below a lower extinction value $E_s$, travels across the body under the effect of the applied potential. The passage of the high electric field (or Gunn) domain across the body of material can be utilised to generate a signal that under suitable conditions can be either a single pulse or a continuous oscillation. Furthermore, the nucleation and maintenance of such Gunn domains can be controlled by manipulation of the electric field existing within the device. This manipulation can be achieved by varying the cross-section of the device and/or by utilising electrodes of differing areas.

By such means there may be produced under given conditions of bias a high intensity field region in the neighbourhood of one of the electrodes and decreasing in intensity towards the other electrode. The non-uniform field can be utilised in two modes of operation in which either the point at which a domain is nucleated is varied, or the point at which a domain is extinguished is varied. Thus control of the device is achieved by controlling a critical field point between the electrodes where the value of the field falls either below the value which is the minimum for nucleating a Gunn domain, or below the minimum of sustaining a Gunn domain.

The applied potential can be derived in part at least, from a source of bias potential, and the remainder can be derived from a separate potential source, either of which can be modulated to provide a variable overall potential, thus varying the domain path length.

In the first mode of operation, the larger electrode is made to act as a cathode and the position of the nucleation of a domain with respect to the cathode is altered by varying the overall potential applied to the device, the distance of the point of nucleation from the cathode increasing with the overall potential applied to the body.

In the second mode of operation the smaller electrode is made to be the cathode, and the electric field in the region of the cathode is made to be greater than $E_t$, so that a domain will nucleate near the cathode electrode. The electric field, however, decreases towards the anode electrode so that at some point in the body the field falls below the extinction value $E_s$, and the domain is extinguished.

In both cases the distance a domain will travel is dependent upon the value of the applied potential because an increase in the applied potential will operate to lengthen the domain path.

As the length of the signal pulse produced by the pulse modulation device is dependent upon the time a domain takes to traverse its path in the device, it can be seen that the signal pulse duration is given by the length of the trajectory of the domain.

If a nucleating potential is applied continuously across the device, the result is a train of signal pulses, the repetition frequency of which can be varied by variation of the total potential applied across the device. Where a bias potential and a triggering potential are applied, the time at which a domain is nucleated is controlled by the trigger pulse and therefore can be fixed as a reference time. The duration of the signal pulse depends upon the time taken for the domain to traverse its path in the body so that the signal pulse duration is dependent upon the magnitude of the overall potential applied across the body. Thus for a varying overall potential there can be provided by a regularly received train of trigger pulses, a series of signal pulses commencing at regular intervals but having durations which vary with the instantaneous value of the applied overall potential. Thus the device can act as a pulse duration modulator.

The means for deriving signal pulses may comprise a resonant cavity surrounding the body of material and adapted to detect the movement of a domain in the body of material, or may comprise a resistive element connected in series with an electrode and adapted to provide as the signal pulse a voltage pulse across the resistive element during the transit of a domain through the body.

If the end of the signal pulse is sensed and utilised to initiate the generation of an output signal, the phase of the output signal relative to that of the trigger pulse will be dependent upon the duration of the signal pulse.

In many circumstances in connection with the generation or use of electrical signals it is necessary to vary the phase of one signal in relation to another. An example is the so-called phased array aerial where several microwave sources are used to generate a well-defined beam of micro-wave radiation. This is achieved by ensuring that a particular phase relationship exists between one source and another. With such a phased array aerial a controlled change in the phase constant of each source utilised in the aerial, enables the micro-beam to be "swept" without having to move physically any part of the aerial array.

Thus in another aspect of the invention there is provided a phase modulation device comprising a pulse duration modulation device as set out above and being operated by a bias potential and triggering potential, and means for deriving an output pulse coincident with the end of the duration of each of the signal pulses to provide a train of periodic output pulses the phase of which relative to said triggering pulses is dependent upon the duration of said signal pulses.

Although in general in this specification the invention is described with reference to the Gunn effect, the principles involved can also be applied to the other high frequency travelling domain phenomena, referred to above.

Embodiments of the invention will now be described by way of example with reference to the accompanying drawings in which.

Figure 1:
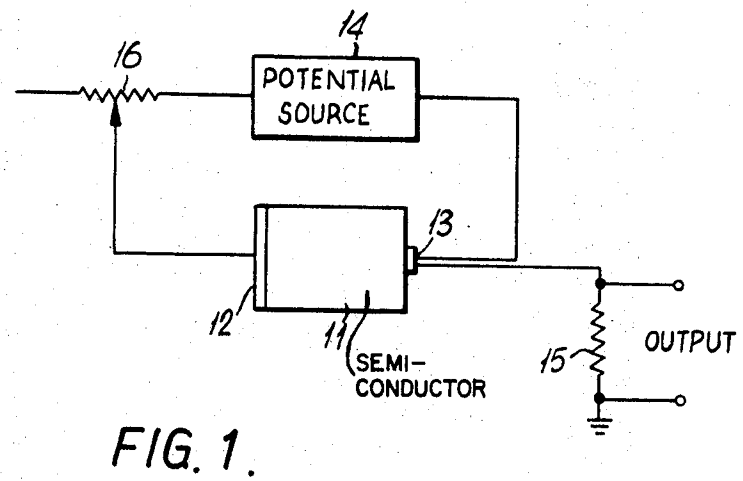
FIG. 1 is a diagrammatic representation of a Gunn diode adapted for use as a pulse frequency modulator.
Figure 5:
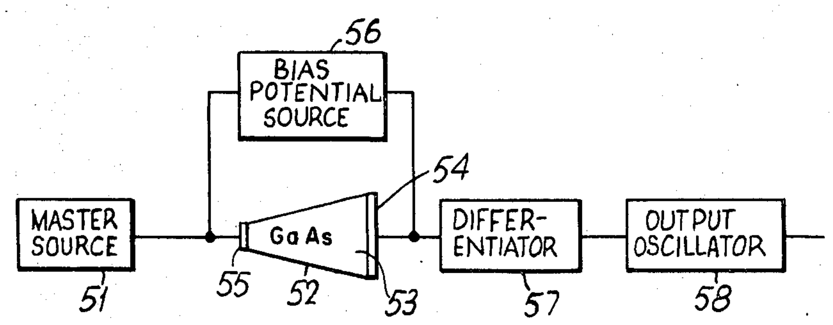
FIG. 5 shows a block circuit diagram of apparatus embodying the invention for effecting phase variation in an electrical signal.

Referring to the drawings, the Gunn effect device of FIG. 1 consists of a body 11 of material capable of exhibiting the Gunn effect, for example, gallium arsenide. On one surface of the body 11 is carried a relatively large electrode 12 and on an opposite surface of the body 11 is carried a relatively small electrode 13. The electrode 12 is shown negatively with respect to the electrode 13. As has been explained, a domain will only be nucleated in the body 11 when the field due to the voltage applied across the electrodes 12 and 13 is larger than that required to produce the threshold field $E_t$. If a sufficiently large voltage is applied across the electrodes 12 and 13, a domain will be nucleated near the large electrode 12 and will travel towards the small electrode 13. The fact that the electrode 12 is larger than the electrode 13 means that the electric field, that is the voltage density gradient, in its neighbourhood will be smaller than the electric field in the neighbourhood of the small electrode 13. This effect can be enhanced by a suitable shaping of the body 11. For example, the body 11 may be made to be trapezoidal in form tapering from the larger electrode 12 to the smaller electrode 13, as shown in FIG. 5. If the applied potential is reduced, the field in the neighbourhood of the large electrode 12 will necessarily decrease and can be made to be smaller than the threshold value $D_t$ for nucleation of a domain while still being above this value in the neighbourhood of the small electrode 13. In these circumstances there will be a point in the body 11 between the electrodes 12 and 13 at which the electric field will reach the value $E_t$ required for the nucleation of a field domain. It can be seen therefore that a field domain will, in these circumstances, be nucleated at some distance from the electrode 12, and the transit time for the domain to travel to the small electrode 13 will be less than when the domain is nucleated near to the large electrode 12.

If however, the electrode 12 is biassed positively with respect to the electrode 13, then, the converse applies. Providing the potential applied is large enough, domains will be nucleated in the neighbourhood of the electrode 13 and will travel through the body 11 towards the electrode 12. The electric field will now be decreasing from the electrode 13 to the electrode 12, and again the field gradient can be enhanced by a suitable shaping of the body 11. By a suitable choice of the parameters of the device and the applied potential the electric field can be made to fall below the second threshold value $E_s$ for the extinction of a field domain, at some point in the body 11 between the two electrodes 12 and 13. As in the first mode of the operation of the device the path length and hence the transit time of a domain created in the body 11 is shortened.

In both cases, a variation of the potential applied across the device will cause a change in the path length of domains within the body 11 and hence a change in the duration of the temporary variation in the electrical characteristics of the body 11 consequent on the passage of a domain through the body 11.

When a continuous potential is applied across the two electrodes 12 and 13 from a source 14 and there is provided means 15 for deriving signal pulses from the domains, the result is that a series of signal pulses are produced from the device. Furthermore, where the potential difference between the electrodes 12 and 13 is reduced as has been described by means of a potentiometer 16, the result will be be that the time interval between successive instances of domain nucleation or extinction will be reduced so that the frequency of the signal pulse train will be increased. Thus it happens that where the potential difference between the electrodes 12 and 13 has been decreased to a level at which domain nucleation occurs at some point in the body 11 away from the large electrode 12, or domain extinction occurs at a corresponding point in the body 11 away from the electrode 13, the frequency of the signal pulses is dependent upon the potential applied to the device. When the applied potential is in the form of a pulse, the amplitude of the potential pulse will control the path length of a domain in the body 11 and the period of time for which a domain will exist in the body 11, and hence the duration of the temporary variation in the electrical characteristics of the body 11. If this change in electrical characteristics is utilised to derive a signal, then the signal also will be in the form of a pulse, the duration of which is dependent upon the amplitude of the applied potential pulse. Thus the device can act as a pulse duration modulation device.

Another method of operation of the device is to provide only a biassing potential from the source 14 and to arrange that this potential alone is not sufficient to nucleate a domain. Another potential source is used to provide a triggering pulse which is applied to the electrodes 12 and 13 in addition to the biassing potential from the source 14, and is arranged to be of an amplitude such that the overall potential is sufficient to form a domain within the body 11. Thus the trigger pulse will result in the nucleation of a domain, and the path length of the domain in the body 11 will be dependent on the combined trigger and biassing potential.

Figure 2:
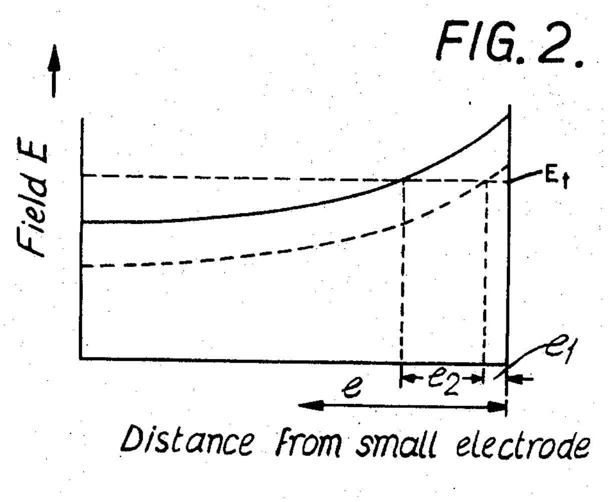
FIG. 2 shows the variation of field with distance across the Gunn device of FIG. 1.

The operation of the device in this mode is illustrated in FIG. 2 which shows the variation of the electric field E in the body 11 with distance $l$ from the small electrode 13. The field distribution when only the biassing potential is present is represented by the dotted line, and the field lines below the threshold value $E_t$ except possibly in a region very close to the small electrode 13. By a suitable choice of material and geometry of the device this region can be made small enough to prevent the growth of any domains. When a trigger pulse is applied in addition to the biassing voltage, the field rises above the threshold value $E_t$ at a distance $l_2$ from the small electrode 13 sufficient for a domain to be nucleated and to travel to the small electrode 13. The biassing potential is such that once the triggering pulse has initiated the domain nucleation, the residual electric field is sufficient to maintain the domain even though this residual field is less than the threshold value $E_t$ required to nucleate a domain.

As the distance from the small electrode 13 at which the domain is nucleated is dependent upon the overall potential difference between the electrodes 12 and 13, it follows that the transit time of the domain, and therefore the duration of the signal pulse produced will be dependent upon the amplitude of the overall potential difference between the electrodes 12 and 13.

There are two ways in which the position at which a domain is nucleated can be varied; firstly, the magnitude of the biassing potential can be varied, and secondly, the amplitude of the triggering pulse can be varied, provided that the biassing potential is sufficient to maintain a residual field greater than the extinction value $E_s$.

Also by reversing the sense in which the potentials are applied across the body 11 in the field can be made to fall below the extinction value $E_s$ at some point between the electrodes 12 and 13 in the absence of the triggering pulse so that a domain nucleated at the small electrode 13 by the triggering pulse will travel through the body 11 of the device until the point is reached at which the value of the field is $E_s$, whereupon it is extinguished. As before, the path length of the domain can be varied either by variation of the magnitude of the biassing potential, or by variation of the amplitude of the triggering pulse. In this case, however, there is a restriction on the maximum value of the biassing potential which must be such that in the absence of the triggering pulse the field in the body 11 does fall below the extinction value $E_s$ at some point in the body 11.

Figure 3:
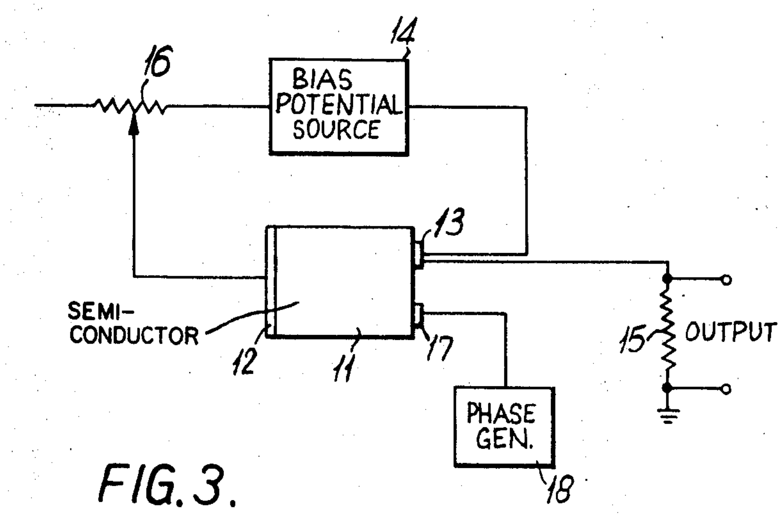
FIG. 3 is a diagrammatic representation of a Gunn device adapted for use as a pulse duration modulator.

In FIG. 3 there is shown a second Gunn device similar to that shown in FIG. 1 except that a second small electrode 17 is added to the surface opposite the large electrode 12. In FIG. 2 elements corresponding to those found in FIG. 1 are referred to by like reference numerals.

Figure 4:
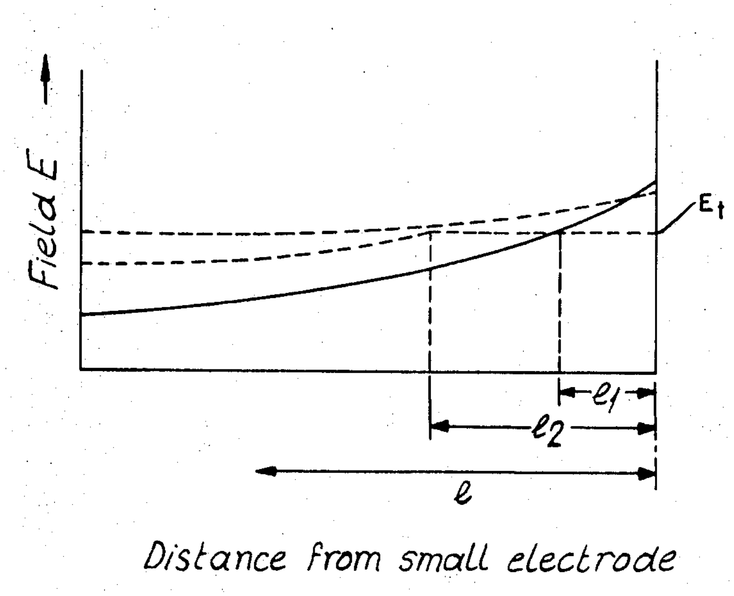
FIG. 4 shows the variation of field with distance across the Gunn device of FIG. 3.

The principle of operation of the device of FIG. 2 is that a biassing potential difference is applied between the large electrode 12 and the small electrode 13, and is arranged to be such that no domain is nucleated when the terminal 17 is electrically floating. When, however, a triggering pulse is applied to the electrode 17 a domain is nucleated in the body 11 at a position dependent upon the overall potential difference across the body 11. FIG. 4 shows the variation of the electric field in the body 11 with distance $l$ from the small electrodes 13 and 17.

If no potential is applied to the electrode 17, the field in the body 11 can be kept below the threshold value $E_t$ except in a region very close to the small electrodes 13 and 17. This region can be made small enough to prevent any growth of domains. When a triggering pulse is applied at the second small electrode 17 from a source 18, however, the field distribution inside the crystal is re-arranged so that the value of the field rises above $E_t$ at a point in the body 11 closer to the large electrode 12. This allows sufficient distance between the point at which the field reaches the threshold value $E_t$ and the small electrode 13 and 17 for a domain to be nucleated and to travel to the small electrode 13. It will be appreciated that once the triggering pulse at 17 has initiated the domain nucleation, the residual electric field is maintained at a value sufficient to maintain the domain even though this residual field is less than the threshold value required to initiate a domain.

As the distance from the small electrodes 13 and 17 at which the domain is nucleated (once the triggering pulse has been applied) is dependent upon the biassing potential applied across the electrodes 12 and 13, it follows that the transit time of the domain, and therefore the duration of the output pulse produced will be dependent upon the amplitude of the biassing potential applied across the electrodes 12 and 13. Alternatively, providing the biassing potential is kept above a certain minimum value, the duration of the pulse can be made to be dependent on the amplitude of the triggering pulse.

Referring to FIG. 4 the variation of electric field across the body 11 is shown for different electrical connections. The curve shown with a solid line represents the field variation where the biasing potential is applied across the electrodes 12 and 13 but no triggering pulse is applied to the electrode 17. The diagram shows that the field E rises above the nucleating threshold value $E_t$ at a distance $l_1$ from the small electrodes 13 and 17. The broken line illustrates the variation of field across the body 11 when a triggering pulse is applied to the second small electrode 17. In this case the field rises above the threshold value $E_t$ at a distance $l_2$ from the small electrodes 13 and 17. As the small electrodes 13 and 17 are positive with regard to the large electrode 12 the distances $l_1$ and $l_2$ represent the distances travelled by domains. It will be seen that changing the shape and position of the field curve relative to the straight horizontal line at the threshold value $E_t$ varies the position at which a domain is nucleated, and thus varies the transit time.

The reason for the absence of nucleation in the absence of a trigger pulse is as follows. In addition to the factor which determines that a domain cannot be nucleated unless the field at some point rises above the threshold value $E_t$, a second factor can prevent nucleation of a domain, in that no domain will be formed if the distance from the point of nucleation to the small electrodes 13 and 17 is less than a minimum which is defined by the geometry and substance of the Gunn effect device. In a typical case it can be arranged that no domain will grow if $n \cdot l < 10^{12}$ cm.$^2$, where $l$ equals the distance from the small electrodes 13 and 17 at which the domain is nucleated and $n$ equals the carrier density. For the purposes of the device in FIG. 3, it can be arranged that the distance $l_1$ shown in FIG. 4 is less than the critical distance to allow a domain to be formed, and the distance $l_2$ is greater than the critical distance. The result of this is that the distance $l_2$ can be arranged to be always greater than the critical minimum distance for domain formation, but is dependent upon the biasing potential across the terminals 12 and 13, or upon the overall potential applied to the body 11.

Thus in using the device as a pulse duration modulator, the time of starting of each pulse can be defined as a regularly recurring reference point, and the duration of each pulse can be modulated by varying the biasing potential applied across the terminals 12 and 13, or by varying the amplitude of the triggering pulse.

In an alternative embodiment the electrode 17 may consist of a relatively long electrode placed along the side surface of the body of material 11 which is substantially perpendicular to the end faces carrying the electrodes 12 and 13. Where the triggering electrode is placed along the domain trajectory it is necessary to provide a relatively long crystal so that the speed of operation is very much reduced. However, in some applications this disadvantage is not important.

The pulse frequencies which can be used with such devices are extremely high, of the order of $10^{10}$ pulses per sec., and in some applications, such as coding information to pass along a transmission line, relatively few pulses are required with long time intervals between them to accommodate the usually required signal bandwiths. In such cases it is possible to transmit modulated pulses of different information signals along the same line if the spacing between the pulses is accurately defined. This can be achieved by further Gunn effect circuits, including a Gunn effect gate which can add the output pulses of several modulators so that several types of information can be transmitted simultaneously along a transmission line.

Where a number of signals are transmitted along the same line in this manner, the signals can be separated from each other at a receiver by the use of Gunn effect comparators such as are described in copending patent application Ser. No. 738,890. Only in the absence of a control pulse at one of the input terminals of such a comparator will a pulse from the transmission line be able to pass the comparator, so that pulses of relatively large pulse width can be applied to control the comparator to select one set of pulses from the transmission line. To produce the relatively large pulse widths required, special Gunn effect pulse generators must be used of different size from those used in the modulator circuits. The timing of the control signals supplied in the receiver can be derived from the timing of the trigger signals supplied to the control terminals such as the terminal 17 in FIG. 3.

As an alternative to using a comparator in which relatively long duration blocking pulses are applied with short periods in which the comparator passes information, the signals from the transmission line can be fed to AND gates in which control signals opening the AND gates are applied for relatively short intervals of time when the required pulses arrive from the transmission line.

The final demodulation process of each set of pulse duration modulated signals can be performed by an integrating circuit in parallel with a by-pass resistor of suitable value. The output of this circuit will vary sinusoidally with the information frequency as the capacitor will be charged and discharged depending upon the frequency of modulated pulses arriving.

Figure 6:
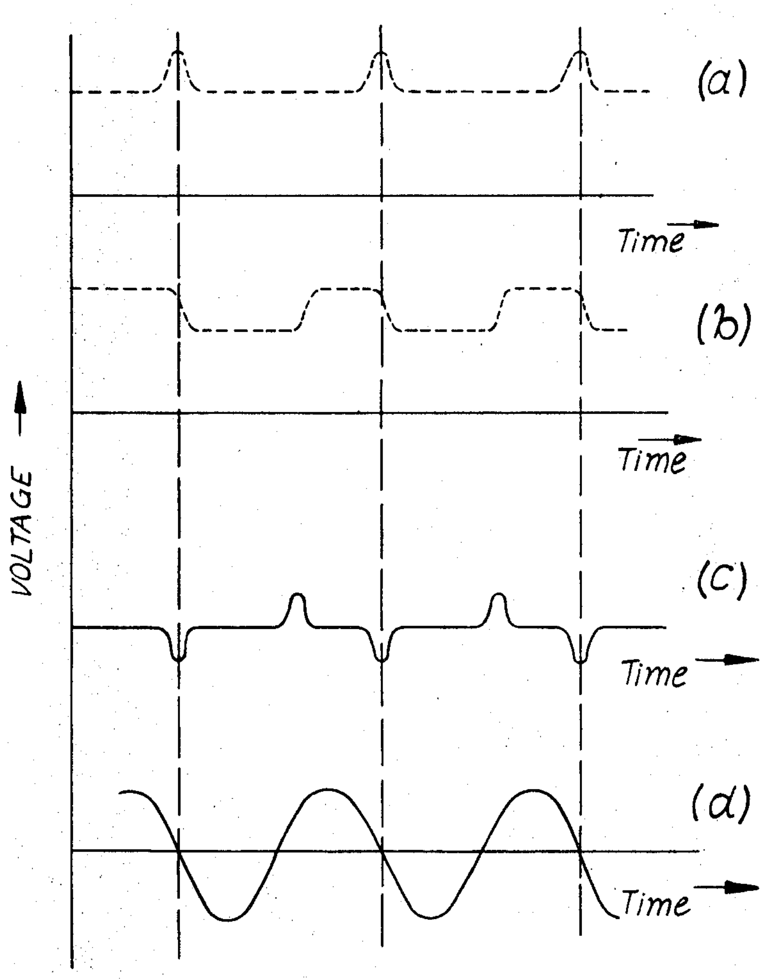
FIG. 6 shows a series of curves showing the relationship between various signals generated in the apparatus of FIG. 4.

Referring to FIGS. 5 and 6 which illustrate a pulse phase modulation device embodying the invention, a master pulse or oscillation source 51 consisting of, for example, a Gunn oscillator, operates at micro-wave frequency, for example, the S band frequency. The signals from the master source 51 are applied to a pulse modulation device 52 consisting of a trapezoidal gallium arsenide crystal 53 having an anode electrode 54 and a cathode electrode 55, the cathode electrode being of smaller area than the anode. The pulse modulation device 52 has a bias potential applied across it from a source 56.

The signals from the master source 51 have a wave form shown in FIG. 6(*a*). When applied to the pulse modulation device 52 in addition to the bias potential, these signals result in the wave form shown in FIG. 6(*b*). The duration of the pulses shown in FIG. 6(*b*) are dependent, as has been explained in the earlier part of the specification, upon the amplitude of the signal generated by the master source 51. A differentiating circuit 57 senses the beginning and the end of the pulses generated by the pulse modulation device 52 and produces a spiked pulse at the beginning of a modulated pulse and another spiked pulse of opposite polarity at the end of the modulated pulse. The second triangular pulse is applied to an output Gunn effect oscillator 58. The phase of the oscillations produced by the output oscillator in relation to the signal generated by the master source 51 will depend upon the length of the modulated pulse, and a change in pulse is thus effected between the signal produced by the master source 51 and that produced by the output oscillator 58.

The output oscillator 58 can operate at the same frequency as the master source 51 or at some harmonic of it. This means that the master source 51 can, if desired, operate at a lower frequency of 5000 megacycles and the output oscillator 58 at S band frequency. This is of advantage if it is desired to use a trapezoidal pulse modulation device as the length of the gallium arsenide wafer can be made long enough for successful shaping to the required geometry.

The pulse duration modulation devices described with reference to FIGS. 1 and 2 or FIGS. 3 and 4, however, do not require any well defined crystal geometry and, therefore, are particularly advantageous for higher frequency applications. The voltage applied from the bias source can be modulated at very high frequencies so that changes in phase within one period of the output oscillation can be achieved, thus rendering ultra-fast phase scanning of micro-wave beams possible.

A use for which the pulse phase modulation device is particularly suitable is the so-called phased array aerial where several micro-wave sources are used to generate a well-defined beam of radiation by ensuring that a particular phase relationship exists between one source and another.

Figure 7:
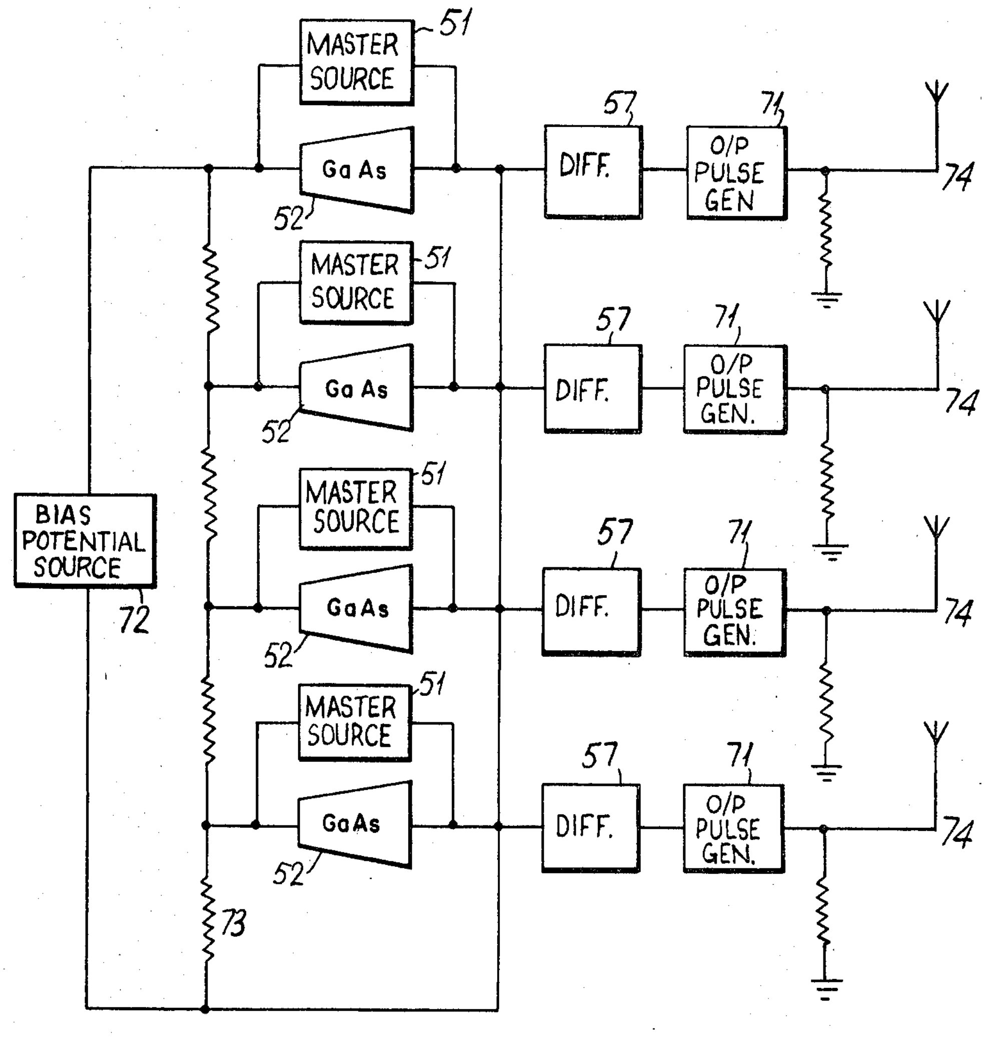
FIG. 7 shows diagrammatically a phased array aerial system embodying the invention.

FIG. 7 shows a phased array aerial, in which a number of oscillators 71 similar to the output oscillator 58 is used, each one of which is associated with a respective pulse modulation device 52. The relative phases of the output oscillators 71 are adjusted by operating their respective pulse modulation devices 52 under differing suitable conditions of bias. The bias potentials being derived from a single source 72 by means of a potential divider 73. Alternatively, a signal from a single master source 51 can be applied to each of a number of pulse modulation devices 52 in turn via a delay line.

A controlled change in the phase constant of each of the output signal generators utilised in the aerial enables the micro-wave beam to be "swept" without having to physically move any part of the aerial array.

I claim:

1. A pulse duration modulation device comprising a body of material capable of exhibiting a travelling field domain phenomenon when a field is produced in the body above a first threshold value to nucleate a domain and is maintained above a second threshold value to sustain the domain;

a plurality of contact means carried on said body;

means for applying between said contact means a potential difference to nucleate a field domain in said body, said contact means and said body having a configuration such that said potential difference produces a non-uniform field in said body;

means for deriving signal pulses from field domains in said body; and means for varying the distance travelled by said field domains in said body to vary the duration of said signal pulses.

2. A pulse duration modulation device comprising;

a body of semi-conductor material capable of exhibiting the Gunn effect travelling domain phenomenon;

a plurality of contact means comprising electrodes carried on said body;

means for applying between said electrodes an electrical potential difference to nucleate a Gunn effect domain in said body, said electrodes and said body having a configuration such that said potential difference produces a non-uniform field in said body;

means for deriving signal pulses from Gunn effect domains in said body; and means for varying the distance travelled by said Gunn effect domains in said body to vary the duration of said signal pulses.

3. A pulse duration modulation device according to claim 2 wherein said contact means comprise;

a contact means of relatively large area carried on one surface of said body; and a contact means of relatively small area carried on a second surface of said body.

4. A pulse duration modulation device according to claim 2, wherein said contact means comprise;

a contact means of relatively large area carried on one surface of said body; and first and second contact means of relatively small area carried on another surface of said body.

5. A pulse duration modulation device according to claim 2, wherein said means for varying the distance travelled by said domain comprises;

means for varying said potential difference applied to said body.

6. A pulse duration modulation device according to claim 2, wherein said means for applying a potential difference between said contact means operates to maintain said potential difference applied to said body at a value such as to generate a continuous train of signal pulses the repetition frequency of which is dependent upon the distance travelled by said domains in said body.

7. A pulse duration modulation device according to claim 2, wherein said means for applying a potential between said contact means includes;

means for applying a biassing potential to said body; and means for applying a periodic triggering potential pulse to said body to nucleate domains in said body commencing at regular intervals.

8. A pulse duration modulation device according to claim 7, wherein said means for applying biassing potential operates to maintain said potential substantially constant and said means for applying a triggering potential pulse includes means for varying the amplitude of said triggering pulse to vary the duration of said signal pulses.

9. A pulse duration modulation device according to claim 7, wherein said means for applying a triggering potential pulse operates to maintain the amplitude of said triggering pulse substantially constant, and said means for applying a biassing potential includes means for varying the magnitude of such biassing potential to vary the duration of said signal pulses.

10. A pulse modulation device according to claim 1, wherein said means for varying the distance travelled by said domain in said body is operative to vary the position in said body at which said domains are nucleated.

11. A pulse modulation device according to claim 1, wherein said means for varying the distance travelled by said domains in said body is operative to vary the position in said body at which said domains are extinguished.

12. A phase modulation device comprising;

a pulse duration modulation device according to claim 7; and means for deriving a second triggering pulse coincident with the end of the duration of each of the signal pulses to provide a train of periodic output pulses, the phase of said output pulses relative to said triggering pulses being dependent upon the duration of said signal pulses.

13. A pulse duration modulation device, according to claim 2 wherein said signal pulses are produced across a resistive element connected to one of said electrodes.

14. A pulse duration modulation device according to claim 2 wherein said signal pulses are produced by means of a resonant cavity device coupled to said body of material.

15. A pulse duration modulation device according to claim 2, wherein said semi-conducting material is a compound of a Group III–A and a Group V–A element of the periodic table.

16. A pulse duration modulation device according to claim 15 in which the said material is gallium arsenide.

17. A pulse duration modulation device according to claim 2 wherein the said body is trapezoidal in shape.

18. A plurality of pulse phase modulation devices comprising:

a plurality of pulse duration modulation devices comprising a body of semi-conductor material capable of exhibiting the Gunn effect traveling domain phenomenon; a plurality of contact means comprising electrodes carried on said body; means for applying between said electrodes an electrical potential difference to nucleate a Gunn effect domain in said body, said electrodes and said body having a configuration such that said potential difference produces a non-uniform field in said body, where said means for applying a potential between said contact means includes means for applying a biassing potential to said body and means for applying a periodic triggering potential pulse to said body to nucleate domains in said body commencing at regular intervals; means for deriving signal pulses from Gunn effects domains in said body; and means for varying the distance travelled by said Gunn effect, domains in said body to vary the duration of said signal pulses;

means for deriving a second triggering pulse coincident with the end of the duration of each of the signal pulses to provide a train of periodic output pulses, the phase of said output pulses relative to said triggering pulses being dependent upon the duration of said signal pulses;

means for establishing a given phase relationship between said output pulses from each of said pulse phase modulation devices; and a plurality of aerial means driven by said output pulses for forming a phased array aerial.

References Cited

UNITED STATES PATENTS 3,486,132 12/1969 Yu ---------------- 331—107

ROBERT L. GRIFFIN, Primary Examiner
K. W. WEINSTEIN, Assistant Examiner

U.S. Cl. X.R.

325—142, 145, 157, 180; 331—107; 332—9